(12) United States Patent
Yoshizawa (10) Patent No.: US 6,813,052 B2
(45) Date of Patent: Nov. 2, 2004

(54) OPTICAL SCANNER AND IMAGE FORMING APPARATUS USING THE SAME

(75) Inventor: Hiroshi Yoshizawa, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 10/323,808

(22) Filed: Dec. 20, 2002

(65) Prior Publication Data

US 2004/0085605 A1 May 6, 2004

(30) Foreign Application Priority Data

Dec. 21, 2001 (JP) .......................................... 2001-389247
Nov. 13, 2002 (JP) .......................................... 2002-329742

(51) Int. Cl.[7] .............................................. G02B 26/08
(52) U.S. Cl. ...................... 359/216; 359/204; 359/206; 347/243; 347/245; 347/259; 347/261
(58) Field of Search ................................ 359/216–219, 359/204–206; 347/243–245, 259–261

(56) References Cited

U.S. PATENT DOCUMENTS 6,172,786 B1 * 1/2001 Fujita et al. ................. 359/200
6,195,190 B1 * 2/2001 Tachibe et al. .............. 359/216
6,700,687 B1 * 3/2004 Itabashi ...................... 359/212

FOREIGN PATENT DOCUMENTS

JP          10-186267          7/1998

* cited by examiner

Primary Examiner—James Phan
(74) Attorney, Agent, or Firm—Oblon, Spivak, McClelland, Maier & Neustadt, P.C.

(57) ABSTRACT

An optical scanner for an image forming apparatus of the present invention includes a polygonal mirror for steering a scanning beam incident thereto and an optical device located in the vicinity of the polygonal mirror. The polygonal mirror and optical device are supported by a housing. A heat radiation guide adjoins the polygonal mirror and is formed integrally with or separately from the housing. The heat radiation guide has a guide surface inclined relative to the axis of rotation of the polygonal mirror and intersecting a plane virtually formed by a scanning beam.

16 Claims, 8 Drawing Sheets

OPTICAL SCANNER AND IMAGE FORMING APPARATUS USING THE SAME

BACKGROUND OF THE INVENTION

1. Field of the Invention

The present invention relates to an optical scanner and an image forming apparatus using the same.

2. Description of the Background Art

Generally, an optical scanner for a laser printer or similar image forming apparatus includes various optical elements including an f-θ lens. If the temperature of any one of the optical element varies, its optical characteristics vary due to thermal expansion with the result that scanning speed on an image surface and therefore the magnification of an image varies. This problem is particularly serious with a tandem image forming apparatus that forms a color image with a plurality of photoconductive elements and a plurality of f-θ lenses assigned one-to-one to the photoconductive elements. More specifically, in this type of image forming apparatus, when the temperature of the individual optical elements arranged on optical paths varies, magnification varies from one element to another element in the main scanning direction due to thermal expansion, resulting in color shift. The temperature variation of, e.g., the f-θ lenses is ascribable to hot air streams produced by a polygonal mirror, which spins at high speed, as well as other causes. The resulting thermal expansion causes the magnifications of images to differ from each other in the main scanning direction, so that colors are shifted from each other.

Japanese Patent Laid-Open Publication No. 08-146319, for example, discloses an image forming apparatus configured to sense changes in optical magnification and correct magnifications by varying pixel clocks or shifting mirrors on an optical path. Such correction, however, is difficult to execute page by page and is usually executed between consecutive jobs. It is extremely difficult to correct the variation of magnification each time during a series of jobs.

Technologies relating to the present invention are also disclosed in, e.g., Japanese Patent Laid-Open Publication No. 10-186267.

SUMMARY OF THE INVENTION

It is an object of the present invention to provide an optical scanner capable of obviating the sharp variation of color shift by reducing the influence of heat generated by a polygonal mirror, and an image forming apparatus using the same.

In accordance with the present invention, an optical scanner for an image forming apparatus includes a polygonal mirror for steering a scanning beam incident thereto and an optical device located in the vicinity of the polygonal mirror. The polygonal mirror and optical device are supported by a housing. A heat radiation guide adjoins the polygonal mirror and is formed integrally with or separately from the housing. The heat radiation guide has a guide surface inclined relative to the axis of rotation of the polygonal mirror and intersecting a plane virtually formed by a scanning beam.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

To better understand the present invention, brief reference will be made to a conventional optical scanner, shown in FIG. 1. As shown, the optical scanner, generally 10', includes a flat, box-like, hermetically closed housing 20. A polygonal mirror 3 is positioned at substantially the center of the housing 20 and implemented as a first and a second polygonal mirror 3u and 3d stacked on each other. The first and second mirrors 3u and 3d are capable of spinning about an axis O at high speed together Four photoconductive drums or elements 1BK, 1Y, 1C and 1M are sequentially arranged side by side, as named from the left to the right, while facing the scanner 10'. The drums 1BK, 1Y, 1C and 1M are assigned to black (BK), yellow (Y), cyan (C) and magenta (M), respectively.

A number of optical elements are arranged in the housing 20 in order to scan the drums 1BK through 1M with laser beams, as illustrated. A group of optical elements positioned at the left-hand side of the polygonal mirror 3 are assigned to the drums 1BK and 1Y. A group of optical elements positioned at the right-hand side of the polygonal mirror 3 are assigned to the drums 1C and 1M.

The optical elements at the left-hand side are subdivided into a group assigned to the drum 1BK and a group assigned to the drum 1Y. The optical elements assigned to the drum 1BK include an f-θ lens 4-BK, a mirror 5-1BK, a troidal lens 6-BK, and mirrors 5-2BK and 5-3BK. A laser beam is incident to the drum 1BK via the optical elements 4-BK, 5-1BK, 6-BK, 5-2BK and 5-3BK and then a dust-proof glass 7-BK in this order. Likewise, the optical elements assigned to the drum 1Y include an f-θ lens 4-Y, a mirror 5-1Y, a troidal lens 6-Y, and mirrors 5-2Y and 5-3Y. A laser beam is incident to the drum 1Y via the optical elements 4-Y, 5-1Y, 6-Y, 5-2Y and 5-3Y and then a dust-proof glass 7-Y in this order.

Figure 1:
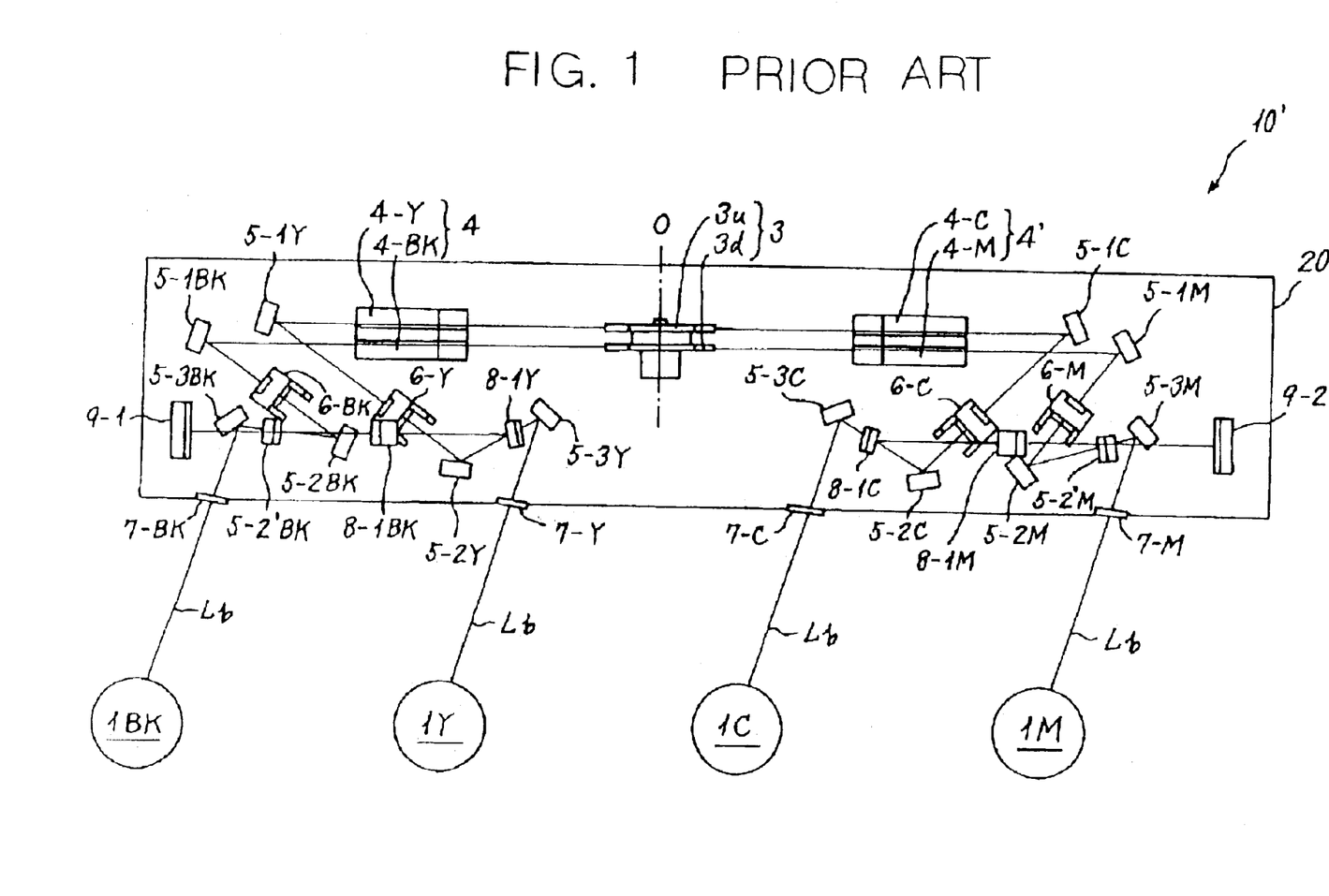
FIG. 1 is a view showing the general construction of a conventional optical scanner.

The drums 1BK and 1Y, f-θ lenses 4-BK and 4-Y, mirrors 5-1BK, 5-2-BK, 5-1Y and 5-2Y and dust-proof glasses 7-BK and 7-Y each extend to the rear as viewed in the direction perpendicular to the sheet surface of FIG. 1. The f-θ lenses 4BK and 4Y are constructed integrally with each other and will be referred to as an f-θ optical device 4 hereinafter.

A sensor 9-1 is located in the vicinity of a scanning start end in order to determine write start timings assigned to the drums 1BK and 1Y. The sensor 9-1 is used to sense both of laser beams Lb directed toward the drums 1BK and 1Y.

More specifically, one of the laser beams Lb reflected by one end of the mirror 5-2BK is sequentially reflected by mirrors 5-2'BK and 8-1BK and then incident to the sensor 9-1. Likewise, the other laser beam Lb reflected by one end of the mirror 5-2 is reflected by a mirror 8-1Y toward the sensor 9-1. The mirrors 5-2'BK, 8-1BK and 8-1Y, used to reflect the laser beams Lb toward the sensor 9-1, do not have to be elongate and are implemented as small mirrors.

The optical elements at the right-hand side, which are arranged symmetrically to the optical elements at the left-hand side, are subdivided into a group assigned to the drum 1M and a group assigned to the drum 1C. The optical elements assigned to the drum 1M include an f-θ lens 4-M, a mirror 5-1M, a troidal lens 6-M, and mirrors 5-2M and 5-3M. A laser beam is incident to the drum 1BK via the optical elements 4-M, 5-M, 6-M, 5-2M and 5-3M and then a dust-proof glass 7-M in this order. Likewise, the optical elements assigned to the drum 1C include an f-θ lens 4-C, a mirror 5-1C, a troidal lens 6-C, and mirrors 5-2C and 5-3C. A laser beam is incident to the drum 1C via the optical elements 4-C, 5-1C, 6-C, 5-2C and 5-3C and then a dust-proof glass 7-C in this order.

The drums 1M and 1C, f-θ lenses 4-M and 4-C, mirrors 5-1M, 5-2-M, 5-1C and 5-2C and dust-proof glasses 7-M and 7-C each extend to the rear as viewed in the direction perpendicular to the sheet surface of FIG. 1. The f-θ lenses 4-M and 4-C are constructed integrally with each other and will be referred to as an f-θ optical device 4' hereinafter.

A sensor 9-2 is located in the vicinity of a scanning start end in order to determine write start timings assigned to the drums 1M and 1C. The sensor 9-1 is used to sense both of laser beams Lb directed toward the drums 1M and 1C. More specifically, one of the laser beams Lb reflected by one end of the mirror 5-2M is sequentially reflected by mirrors 5-2'M and 8-1M and then incident to the sensor 9-2. Likewise, the other laser beam Lb reflected by one end of the mirror 5-2C is reflected by a mirror 8-1M toward the sensor 9-2. The mirrors 5-2'M, 8-MK and 8-1C, used to reflect the laser beams Lb toward the sensor 9-2, do not have to be elongate and are implemented as small mirrors.

Figure 2:
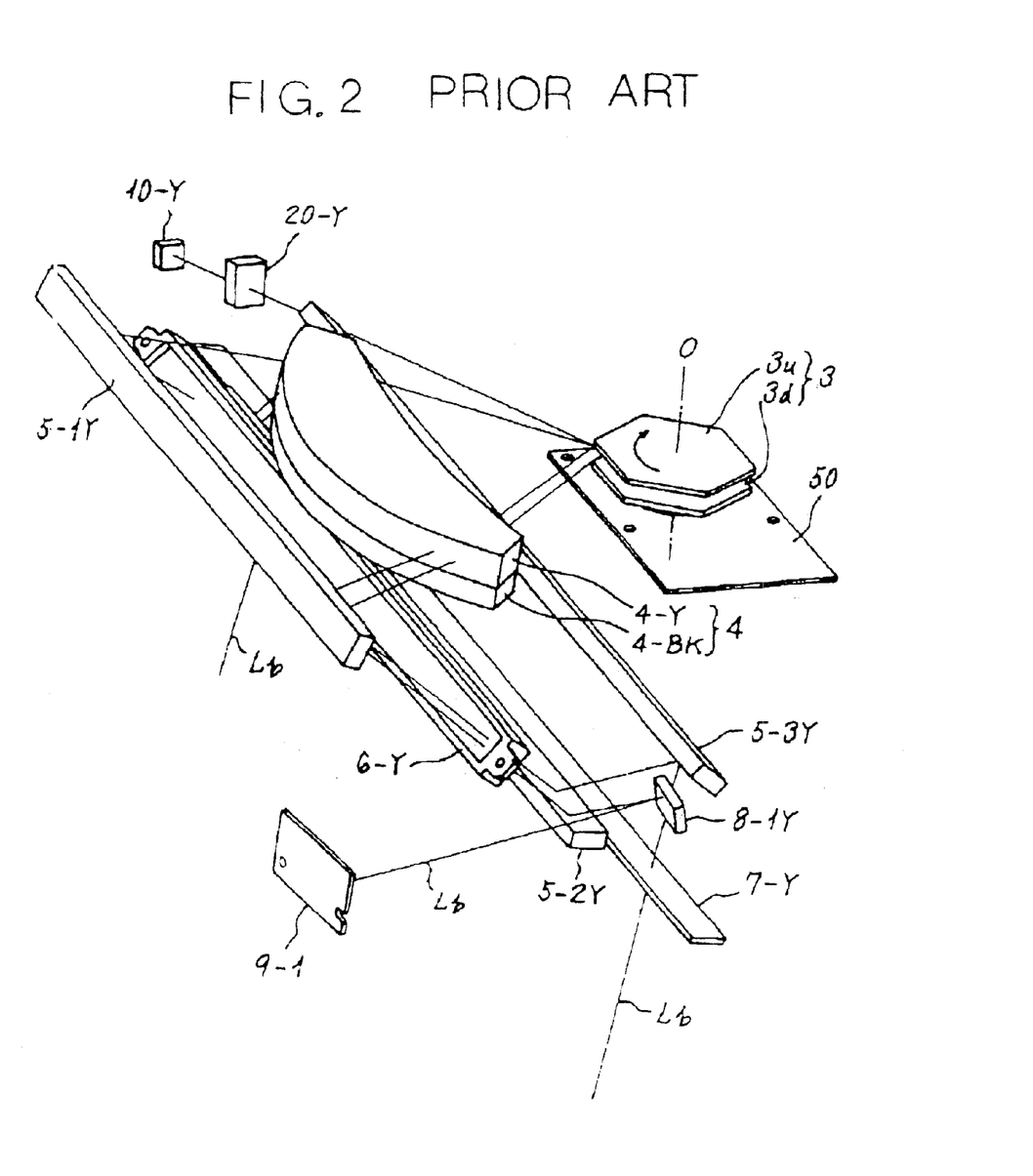
FIG. 2 is a fragmentary view showing part of the conventional optical scanner assigned to yellow by way of example.
Figure 3:
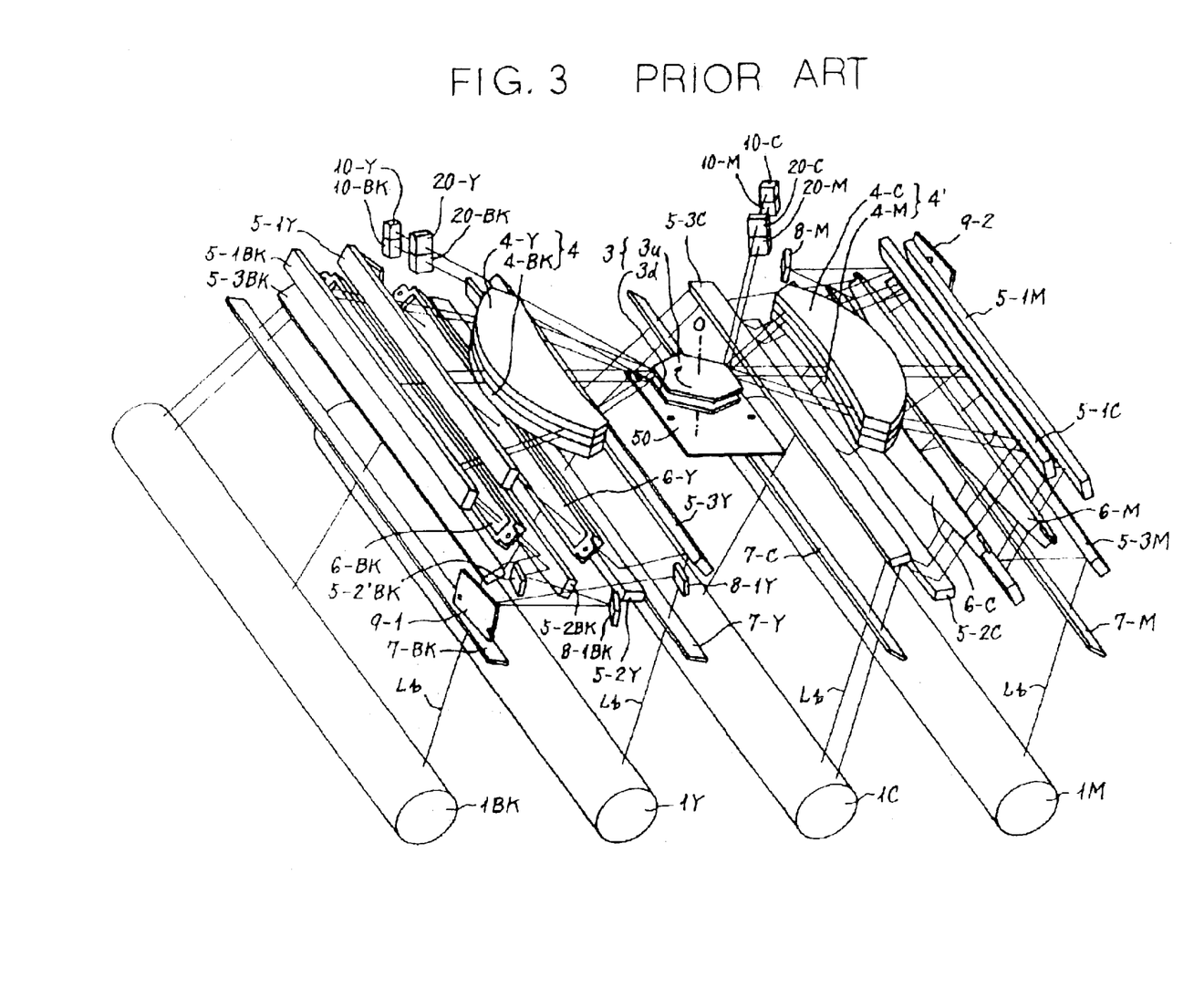
FIG. 3 is a perspective view showing optical paths formed in the conventional optical scanner.

FIGS. 2 and 3 show the optical arrangement of the scanner shown in FIG. 1 three-dimensionally. FIG. 2 shows part of the optical arrangement assigned to the drum 1Y while FIG. 3 shows the entire optical arrangement. As shown, the scanner additionally include lasers 10-Y and 10-BK and cylindrical lenses 20-Y and 20-BK assigned to the left group of optical elements and laser beams 10C and 10-M and cylindrical lenses 20-C and 20-M assigned to the right group of optical elements.

Figure 4:
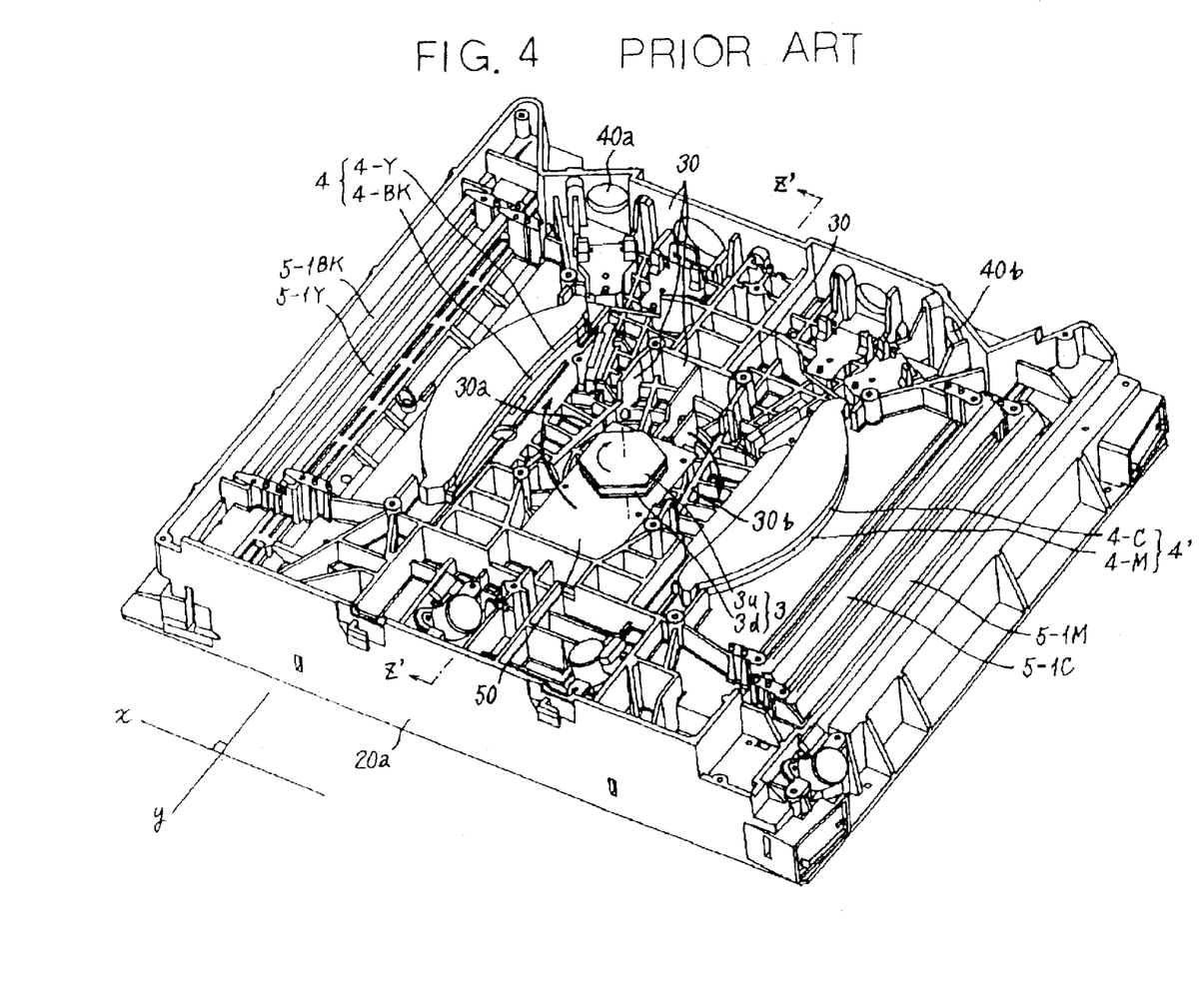
FIG. 4 is a perspective view showing a housing included in the conventional optical scanner.

FIG. 4 shows the optical elements of the conventional scanner mounted on a housing 20*a*, which is formed of plastics. As shown, the polygonal mirror 3 is positioned such that its axis of rotation O extends perpendicular to the bottom of the housing 20*a*. Assume a virtual plane perpendicular to the axis O of the polygonal mirror 3. Then, in this plane, the right and left groups of optical elements are arranged to face each other in a direction x, as shown in FIG. 4. It is to be noted that FIG. 4 shows only representative optical elements and parts in order to avoid complexity. The f-θ optical devices 4 and 4' face each other in the above plane in a direction y perpendicular to the direction x.

As shown in FIG. 4, a number of ribs for reinforcement 30 stand upright from the bottom of the housing 20*a* between the f-θ optical devices 4 and 4' and the polygonal mirror 3 in such a manner as to surround the polygonal mirror 3. The tops of the ribs 30 are flush with each other.

Figure 5:
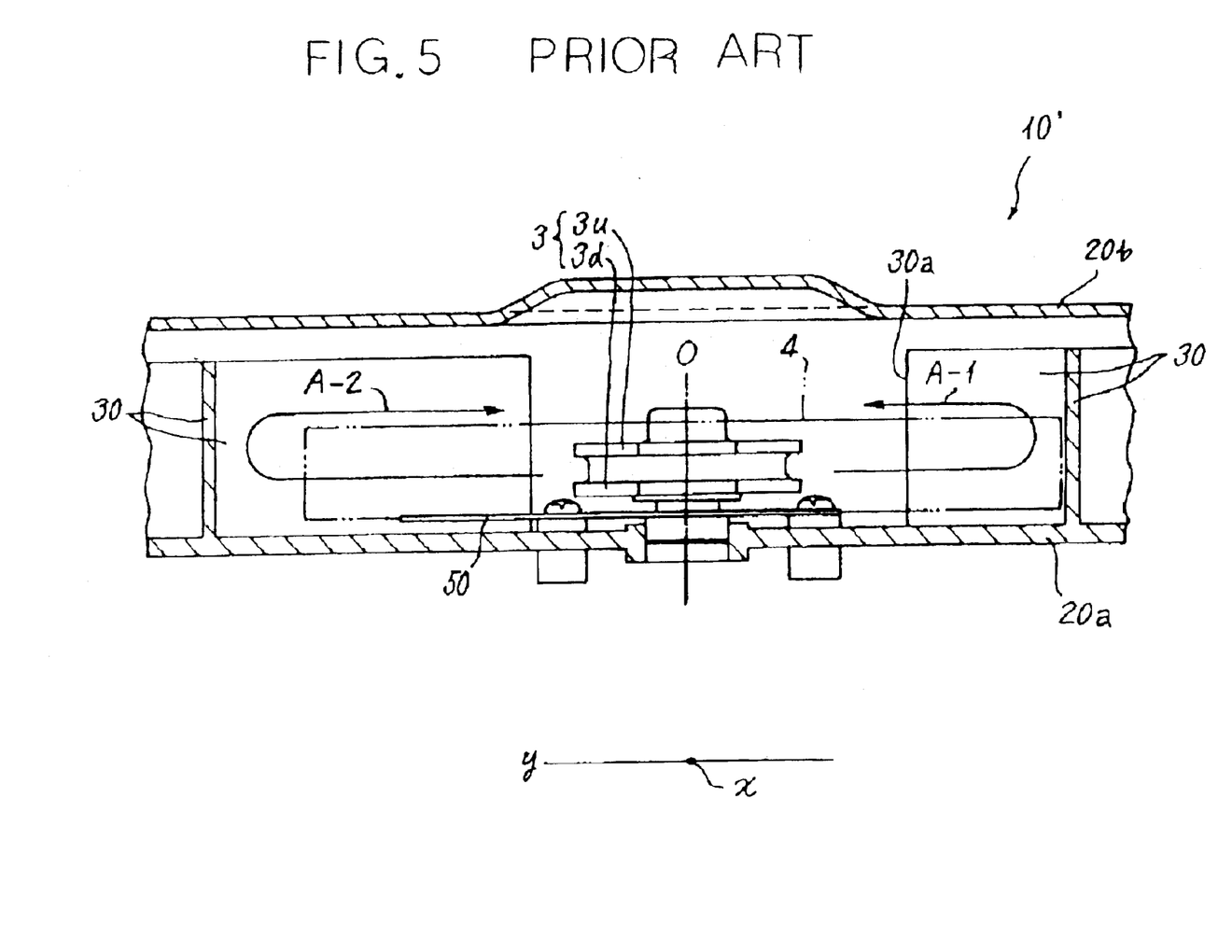
FIG. 5 is a section along line z–z' of FIG. 4.

A cover 20*b*, see FIG. 5, is affixed to the tops of the ribs 30 in order to hermetically seal the housing 20*a*, so that dust is prevented from entering the housing 20*a*. In FIG. 5, the optical scanner is generally designated by the reference numeral 40'.

As shown in FIG. 4, the housing 20*a* is formed with circular holes 40*a* and 40*b*. A subassembly made up of the laser 10-Y and cylindrical lens 20-Y and a subassembly made up of the laser 10-BK and cylindrical lens 20-BK are fitted in the hole 40*a*. Likewise, a subassembly made up of the laser 10-C and cylindrical lens 20-C and a subassembly made up of the laser 10-M and cylindrical lens 20-M are fitted in the other hole 40*b*. The other optical elements shown in FIGS. 1 through 3 all are mounted on the housing 20*a* also.

The ribs 30, surrounding the polygonal mirror 3, serve to provide the housing 20*a*, which is formed of plastics for light-weight configuration and quantity production, with mechanical strength. Particularly, the polygonal mirror 3 spins at high speed and causes the housing 20*a* to vibrate if the mechanical strength of the housing 20*a* is short, effecting image quality. The ribs 30 are partly removed to form notches 30*a* and 30*b*, respectively, so as not to intercept the laser beams issuing in the direction x.

FIG. 5 is a fragmentary section along line z–z' of FIG. 4. As shown, hot air streams A-1 and A-2 produced by the spinning of the polygonal mirror 3 are respectively intercepted by the ribs 30, which face each other, and circulated thereby. Consequently, such hot air flows toward the f-θ optical devices 4 and 4' in large amounts via the notches 30*a* and 30*b*, as indicated by arrows in FIG. 4. It follows that the f-θ optical devices 4 and 4' are expanded by heat and vary the magnifications of images focused on the drums 1BK through 1M in the main scanning direction, resulting in color shift, as stated earlier.

Figure 6:
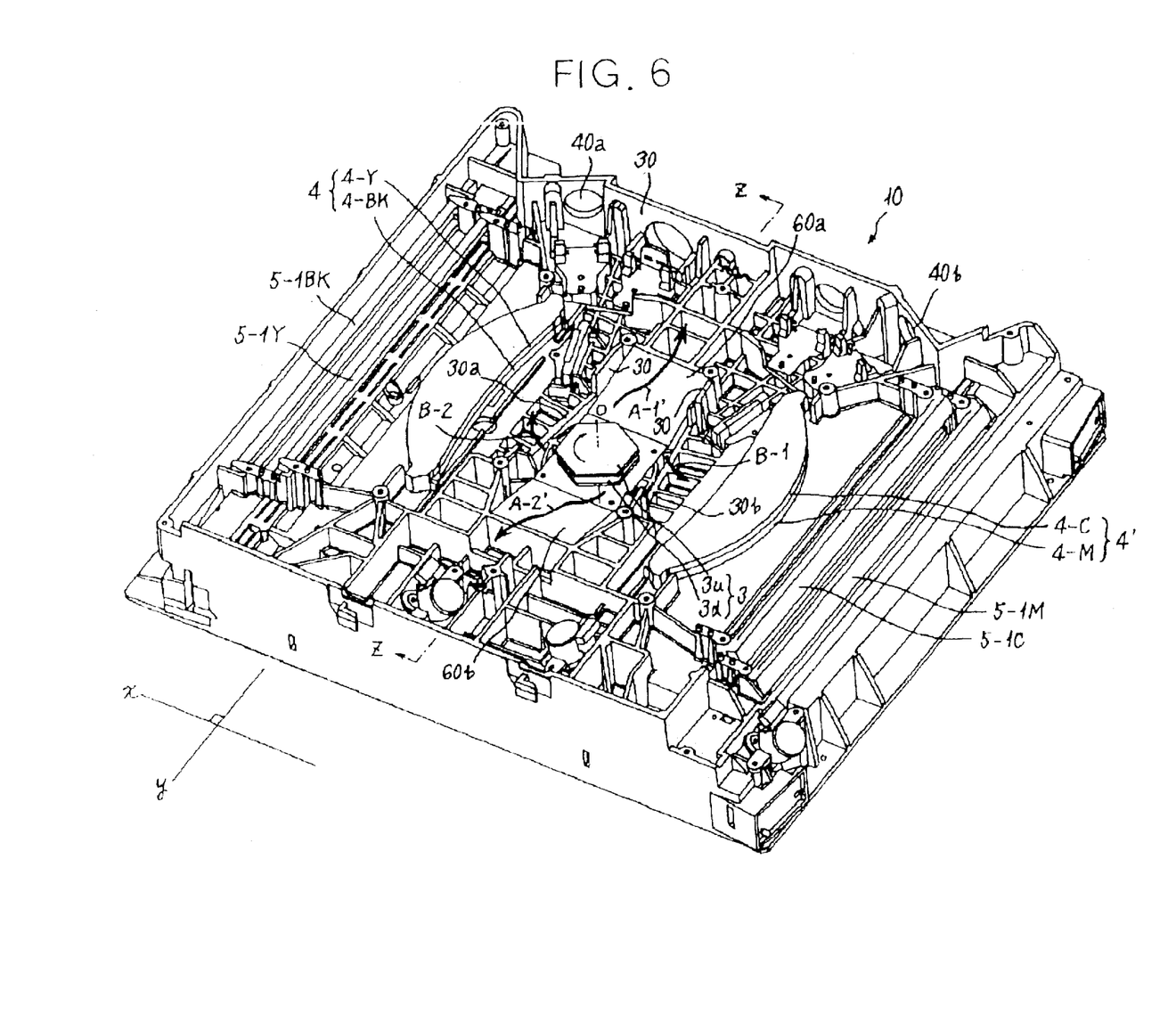
FIG. 6 is a perspective view showing an optical scanner in accordance with the present invention.
Figure 7:
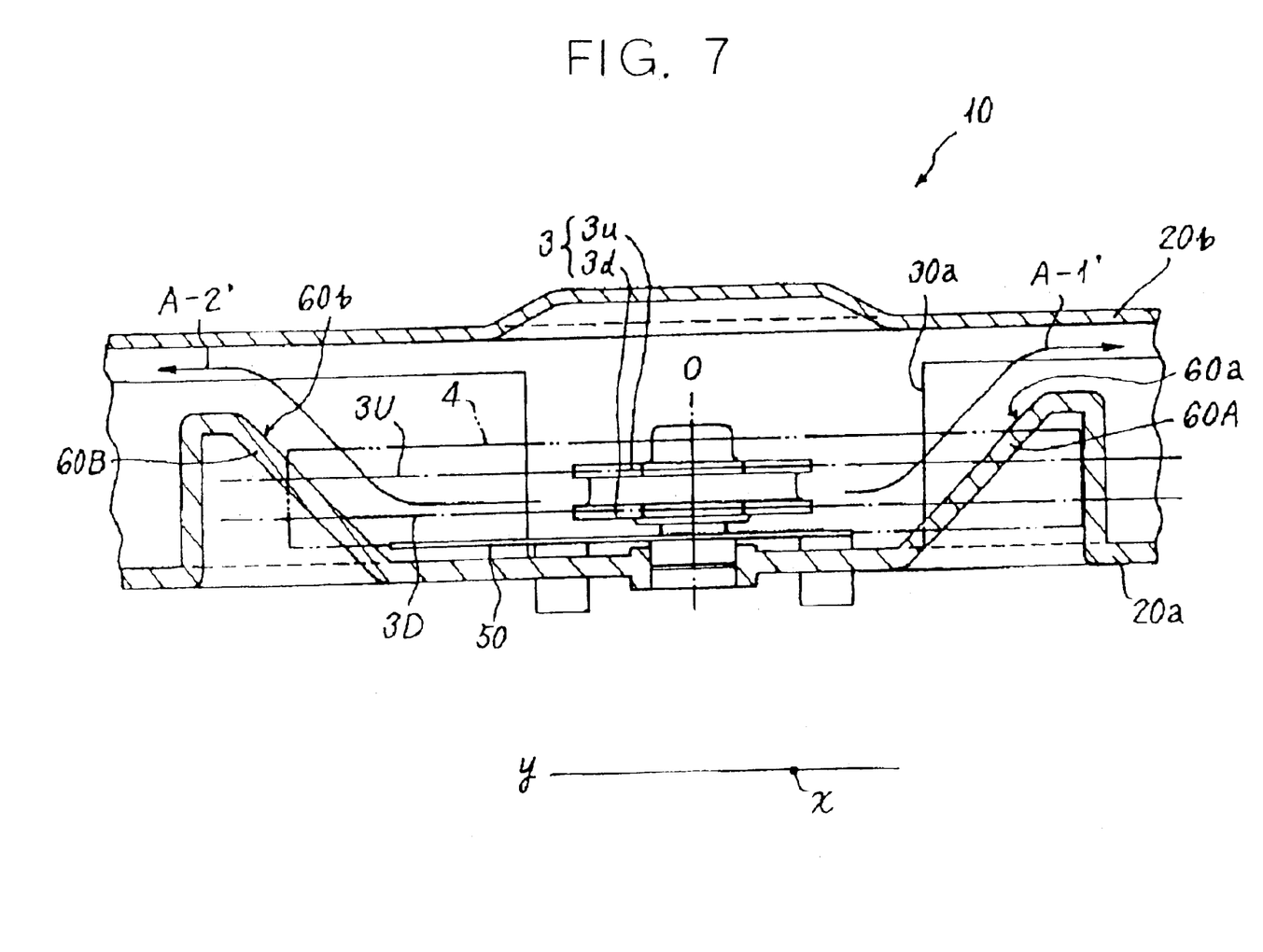
FIG. 7 is a perspective view showing a housing included in the optical scanner of FIG. 6.

Referring to FIGS. 6 and 7, an optical scanner in accordance with the present invention is shown and generally designated by the reference numeral 10. As for a housing, the optical scanner 10 is identical with the conventional optical scanner of FIG. 4 except for the structure around the polygonal mirror 3. The optical parts and arrangement thereof shown in FIGS. 4 and 5 are also applied to the optical scanner 10. In FIGS. 6 and 7, structural elements identical with the structural elements shown in FIGS. 1 through 5 are designated by identical reference numerals and will not be described specifically in order to avoid redundancy.

In a first embodiment of the optical scanner in accordance with the present invention, a heat radiation guide adjoins the polygonal mirror and is formed integrally with or separately from the housing and has a guide surface inclined relative to the axis of rotation of the polygonal mirror and intersecting a plane virtually formed by a scanning beam.

In a second embodiment of the optical scanner in accordance with the present invention, the heat radiation guide adjoining the polygonal mirror and formed integrally with or separately from the housing also has a guide surface inclined relative to the axis of rotation of the polygonal mirror. In the second embodiment, the heat radiation guide is located at a position not corresponding to the position of the optical device.

As shown in FIGS. 6 and 7, in the illustrative embodiments, the optical scanner 10 includes a housing 20*a* formed with heat radiation guides 60A and 60B adjacent a polygonal mirror 3. The heat radiation guides 60A and 60A respectively have guide surfaces 60*a* and 60*b* inclined relative to the axis O of the polygonal mirror 3 and intersecting planes 3U and 3D, which are virtually formed by laser beams. If desired, the heat radiation guides 60A and 60B may be implemented as plates physically separate from and mounted to the housing 20a.

Ribs 30 are formed with notches 30a and 30b. The heat radiation guides 60A and 60B face each other with the intermediary of the axis O of the polygonal mirror 3 in the direction shifted by 90° from the direction x in which the f-θ optical devices 4 and 4' are positioned. As shown in FIG. 7, the tops of the guide surfaces are spaced from a cover 20b.

In the above configuration, hot air streams A-1' and A-2' produced by the polygonal mirror 3, which is spinning, are guided by the inclined guide surfaces 60a and 60b and then diffused in the housing 20a via spaces between the guide surfaces 60a and 60b and the cover 20b. Consequently, the hot air streams A-1 and A-2, FIG. 5, to flow out via the notches 30a and 30b and heat the f-θ optical devices 4 and 4' are reduced in amount, so that the thermal deformation of the optical devices 4 and 4' is reduced to such a degree that it does not effect image quality. This successfully reduces the variation of magnification to appear in an image.

While the guide surfaces 60a and 60b are implemented as a flat surface with linear inclination each, they may alternatively be implemented as a curved surface with continuously varying inclination each, if desired.

In FIG. 7, assume that the virtual planes 3U and 3D are respectively formed by a first and a second polygonal mirror 3u and 3d constituting the polygonal mirror 3 in a stack. Then, the guide surfaces 60a and 60b both intersect the virtual planes 3U and 3D.

Hot air around the mirrors 3u and 3d form strong streams in the virtual planes 3U and 3D, respectively, due to the spinning of the mirrors 3u and 3d. At this instant, the guide surfaces 60a and 60b, intersecting the planes 3U and 3D, efficiently guide the hot air streams to spaces remote from the polygonal mirror 3. More specifically, the inclined surfaces are present at the height of the polygonal mirror 3 where the hot air streams are most strong, promoting the above flow of air. Hot air is therefore diffused via the guide surfaces 60a and 60b, so that the transfer of heat to the f-θ optical devices 4 and 4' is efficiently reduced.

In accordance with the present invention, the heat radiation guides 60A and 60B are positioned outside of a range where laser beams issuing from lasers are propagated through the f-θ optical devices 4 and 4', i.e., located at positions not corresponding to the positions of the optical devices 4 and 4'. Alternatively, the heat radiation guides 60A and 60B may be located at positions corresponding, or facing, the positions of the f-θ optical devices 4 and 4' while intersecting the planes 3U and 3D, in which case the guides 60A and 60B will be formed of a transparent material. In such an alternative configuration, although a material applicable to the heat radiation guides 60A and 60B is limited, hot air in the range where it flows most strongly does not reach the f-θ optical devices 4 and 4', so that the transfer of heat can be efficiently reduced.

While the guide surfaces 60a and 60b of the heat radiation guides 60A and 60B have been shown and described as intersecting the planes 3U and 3D, they may not intersect the plane 3U or 3D if only the configuration of the second embodiment suffices.

More specifically, considering the fact that temperature elevation is not critical in regions where the f-θ optical devices 4 and 4' are absent, the second embodiment guides hot air streams to such regions. In the first embodiment, the guide surfaces 60a and 60b intersect the planes 3U and 3D, so that when the heat radiation guides 60A and 60B correspond in position to the f-θ optical devices 4 and 4', the guides 60A and 60B should be transparent. By contrast, in the second embodiment in which the heat radiation guides 60A and 60B do not correspond in position to the f-θ optical devices 4 and 4', so that the guides 60A and 60B do not have to be transparent.

The guide surfaces 60a and 60b, intersecting the planes 3U and 3D, guide hot air streams upward or downward without causing them to directly contact the f-θ optical devices 4 and 4', which are positioned in the planes 3U and 3D. Although the temperature of the optical devices 4 and 4' rises little by little, such temperature elevation is slow and negligible in practical use.

By locating the heat radiation guides 60A and 60B at positions not corresponding to the f-θ optical devices 4 and 4', it is possible to reduce the influence of heat generated by the polygonal mirror 3 on the optical devices 4 and 4' for thereby obviating color shift. More specifically, when the amount of hot air to flow to the regions (spaces) where the optical devices 4 and 4' are absent is increased, the temperature of the housing 20a and other parts in and around the above regions rises. Assuming that a hot air stream generated by the polygonal mirror 3 is constant, then the amount of hot air reaching the optical device 4 or 4' is considered to decrease if not to zero. By so guiding hot air to the regions where the optical devices 4 and 4' are absent, it is possible to positively produce a temperature distribution in the optical scanner 10 for thereby reducing the temperature elevation of the optical devices 4 and 4'. This is particularly true when the housing 20a and optical devices 4 and 4' are formed of resin whose thermal conductivity is low.

Generally, the f-θ optical devices 4 and 4' adjacent the polygonal mirror 3 are formed of synthetic resin from the cost and quantity production standpoint. Synthetic resin, however, has noticeable influence on the variation of magnification ascribable to temperature variation. In this respect, the guide surfaces 60a and 60b, intersecting the planes 3U and 3D, reduce temperature variation and allow the optical devices 4 and 4' to be formed of synthetic resin with a large coefficient of friction without noticeably effecting image quality. In addition, the optical devices 4 and 4' formed of synthetic resin reduces the overall cost of the scanner 10.

The housing 20a is also formed of synthetic resin from the cost and quantity production standpoint although synthetic resin deforms due to temperature variation. Particularly, part of the housing 20a where the polygonal mirror 3 is positioned is heated. In light of this, a number of ribs are positioned around the above part of the housing 20a for preventing thermal deformation. The ribs block heat radiated from the polygonal mirror 3 and cause it to circulate.

In the illustrative embodiments, the ribs extend upward from the bottom of the housing 20a while being inclined relative to the axis O of the polygonal mirror 3. Hot air streams are therefore diffused along the surfaces of the ribs and can be diffused even if the housing 20a is formed of synthetic resin. This not only minimizes the thermal deformation of the f-θ optical devices 4 and 4' and therefore the degradation of image quality, but also reduces the overall cost of the scanner 10.

In FIGS. 6 and 7, the f-θ optical devices 4 and 4' face each other with the intermediary of the polygonal mirror 3, and each forms a particular optical path. In this case, there can be reduced the variation of magnification on the individual optical path, i.e., the relative displacement of scanning lines in the scanning direction.

Figure 8:
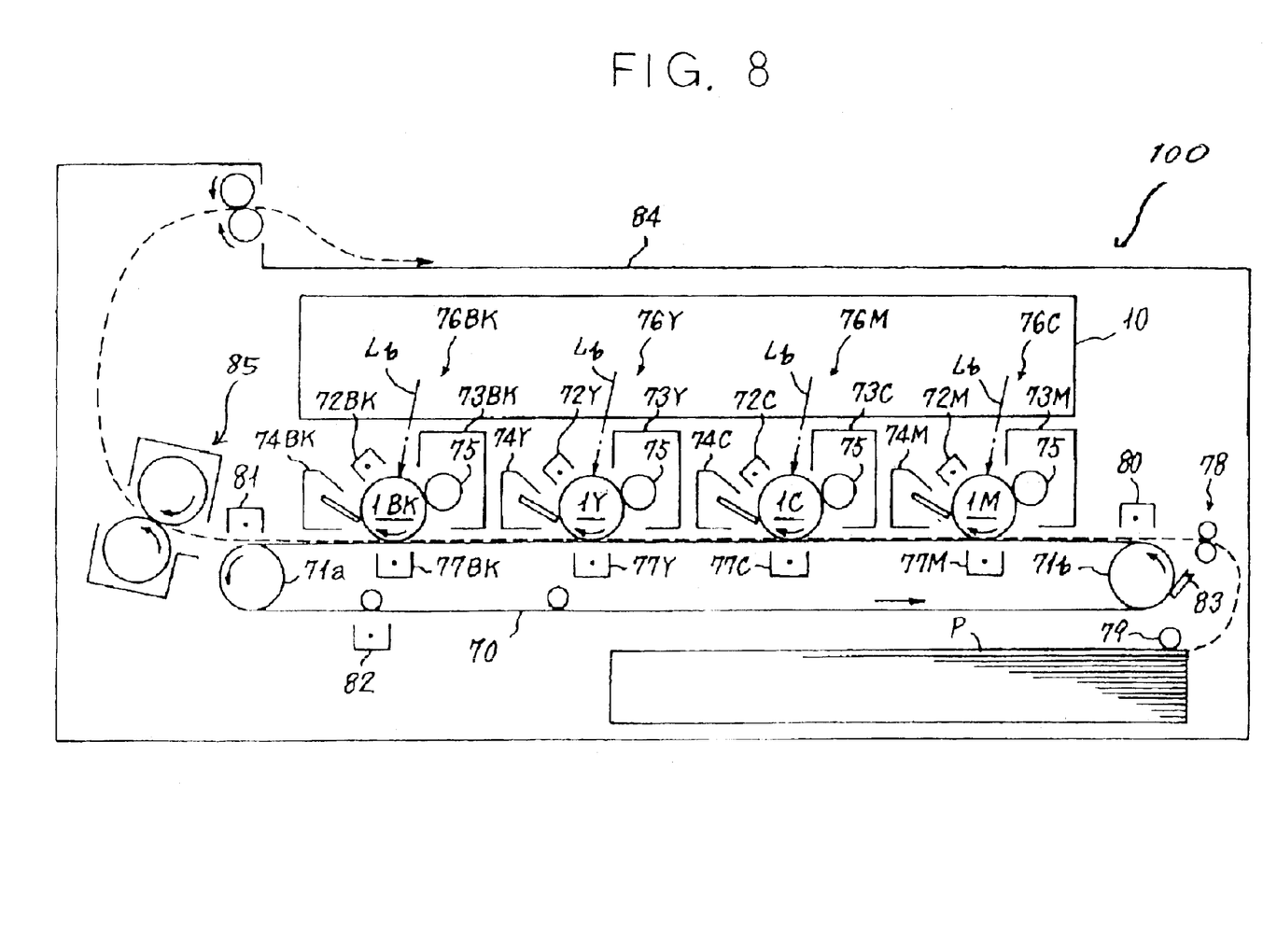
FIG. 8 is a fragmentary view of an image forming apparatus including the optical scanner in accordance with the present invention.

FIG. 8 shows a tandem image forming apparatus including the optical scanner 10. As shown, the tandem image forming apparatus, generally 100, includes a belt 70 passed over two rollers or support members 71a and 71b in the horizontal direction. Photoconductive drums 1BK, 1Y, 1C and 1M are arranged side by side in the direction in which the belt 70 moves, as indicated by an arrow in FIG. 8 (counterclockwise). The drums 1BK through 1M are held in contact with the upper run of the belt 70.

Arranged around the drum 1BK are a non-contact type charger 72BK using a corona wire, a developing unit 73BK, cleaning means 74BK and other process units. Process units arranged around the other drums 1Y, 1C and 1M are distinguished from the process units associated with the drum 1BK by suffixes Y, C and M, respectively. The developing units 74BK through 74M each include a respective developing roller 75 adjoining associated one of the drums 1BK through 1M. The process units around the drums 1BK, 1Y, 1C and 1M respectively constitute image forming means 76BK, 76Y, 76C and 76M facing the belt 70.

Non-contact type image transferring units 77BK, 77Y, 77C and 77M respectively face the drums 1BK, 1Y, 1C and 1M with the intermediary of the belt 70, and each uses a discharge wire.

The optical scanner or writing means 10 is positioned above the drums 1BK through 1M and emits laser beams Lb in accordance with color image signals. The laser beams Lb each are incident to the exposition position of particular one of the drums 1BK through 1M between the charger and the developing unit.

A registration roller pair 78 is positioned upstream of the upstream end of the upper run of the belt 70 in the direction of movement of the belt 70. A sheet or recording medium P is fed toward the registration roller pair 78 by a pickup roller 79.

A fixing unit 85 is positioned downstream of the downstream end of the upper run of the belt 70 in the direction of movement of the belt 70. A non-contact type charger or medium retaining means 80 is positioned above the roller 71b, which supports the upstream side of the belt 70, in order to cause the sheet P to be electrostatically retained P on the belt 70 and is implemented by a corona wire. Discharging means 81 faces the other roller 71a with the intermediary of the upper run of the belt 70 in order to discharge the sheet P, so that the sheet P can easily part from the belt 70.

Non-contact type discharging means 82 faces the lower run of the belt 70 for discharging the belt 70. A cleaning blade 83 for cleaning the belt 70 also faces the roller 71b with the intermediary of the belt 70. The cleaning blade 83 is movable out of contact with the belt 70 so as to avoid the seam of the belt 70.

In operation, when the drums 1BK through 1M start rotating, the chargers 72BK through 72M uniformly charge the surface of the drum 1BK through 1M, respectively, in the dark. The laser beams Lb scan the charged surfaces of the drum 1BK through 1M at timings shifted such that images of different colors are transferred to a single sheet P one above the other, thereby forming latent images on the drums 1BK through 1M. The developing devices 73BK through 73M respectively develop the latent images formed on the drums 1BK through 1M, thereby producing corresponding toner images.

The sheet P paid out by the pickup roller 79 is conveyed to the registration roller pair 78 via a path indicated by a dashed line in FIG. 8. The registration roller pair 78 once stops the sheet P and then conveys it toward the belt 70 at such a timing that the sheet meets the toner images on the drums 1BK through 1M at the consecutive image transfer positions. At this instant, the charger 80 causes the sheet P to be electrostatically retained on the belt 70. The movement of the belt 70 is controlled such that the sheet P does not overly the seam thereof. For this purpose, a mark may be provided on the belt 70.

At the consecutive image transfer positions, the toner images formed on the drums 1BK through 1M are sequentially transferred to the sheet P one above the other, completing a full-color toner image. At the transfer positions, the drums 1BK through 1M are held in contact with the belt 70 while the image transferring units 77BK through 77M face the belt 70.

The sheet P with the full-color toner image is discharged by the discharging means 81, separated from the belt 70, and then brought to the fixing unit 85. After the toner image has been fixed on the sheet P by the fixing unit 85, the sheet or print P is driven out to a tray 84.

The cleaning means 74BK through 74M respectively remove toner left on the drums 1BK through 1M after the image transfer, thereby preparing the drums 1BK through 1M for the next image forming cycle. Likewise, after the separation of the sheet P, the belt 70 is discharged by the discharging means 82 and then cleaned by the cleaning blade 83. Why the cleaning blade 83 cleans the belt 70 is that toner partly transferred from the drums 1BK through 1M to the belt 70 and paper dust deposited on the belt 70 are apt to bring about offset on the next sheet. The cleaning blade 83 is released from the belt 70 just before the seam of the belt 83 reaches it, and again brought into contact with the belt 70 after the seam has moved away.

In the tandem image forming apparatus described above, if the temperature of the individual f-θ lens or similar optical device, not shown, located on an optical path varies, then a magnification in the main scanning direction varies due to thermal expansion. The optical scanner 10 in accordance with the present invention obviates the above problem, as stated earlier.

The cover 20b may be formed of aluminum or similar material having high thermal conductivity, in which case a fan will be positioned in the vicinity of the cover 20b and driven in synchronism with the polygonal mirror 3 for a cooling purpose. Alternatively, the housing 20a may be formed of metal in order to promote heat radiation.

In summary, it will be seen that the present invention provides an optical scanner and an image forming apparatus using the same having various unprecedented advantages, as enumerated below.

(1) Hot air streams produced by a polygonal mirror, which is spinning, surely hit against guide surfaces, so that the transfer of heat to f-θ optical devices is efficiently reduced. This successfully obviates the sharp variation of positional or color shift.

(2) The hot air streams are guided to regions where the f-θ optical devices are absent so as to establish a temperature distribution in the scanner, thereby reducing temperature elevation of the optical devices. This is particularly effective when the scanner and optical devices are formed of resin.

(3) Image quality is effected little even when the f-θ optical devices as well as a housing is formed of synthetic resin, which is desirable from the cost standpoint.

(4) The variation of magnification on a plurality of optical paths and therefore the relative displacement of scanning lines in the scanning direction is reduced, so that high image quality is insured.

(5) The image forming apparatus reduces the degradation of image quality ascribable to the thermal deformation of the f-θ optical devices.

Various modifications will become possible for those skilled in the art after receiving the teachings of the present disclosure without departing from the scope thereof.

What is claimed is:

1. An optical scanner comprising:
   a polygonal mirror for steering a scanning beam incident thereto;
   an optical device located in the vicinity of said polygonal mirror;
   a housing supporting said polygonal mirror and said optical device; and
   a heat radiation guide adjoining said polygonal mirror and formed integrally with or separately from said housing and having a guide surface that is inclined relative to an axis of rotation of said polygonal mirror and intersects a plane virtually formed by the scanning beam.

2. The scanner as claimed in claim 1, wherein said optical device comprises a plurality of f-θ optical devices each forming a particular optical path.

3. The scanner as claimed in claim 1, wherein said housing is formed of resin.

4. The scanner as claimed in claim 3, wherein said optical device comprises a plurality of f-θ optical devices each forming a particular optical path.

5. The scanner as claimed in claim 1, wherein said optical device is formed of resin.

6. The scanner as claimed in claim 5, wherein said housing is formed of resin.

7. The scanner as claimed in claim 6, wherein said optical device comprises a plurality of f-θ optical devices each forming a particular optical path.

8. An optical scanner comprising:
   a polygonal mirror for steering a scanning beam incident thereto;
   an optical device located in the vicinity of said polygonal mirror;
   a housing supporting said polygonal mirror and said optical device; and
   a heat radiation guide adjoining said polygonal mirror and formed integrally with or separately from said housing and having a guide surface that is inclined relative to an axis of rotation of said polygonal mirror, said heat radiation guide being located at a position not corresponding to a position of said optical device.

9. The scanner as claimed in claim 8, wherein said optical device comprises a plurality of f-θ optical devices each forming a particular optical path.

10. The scanner as claimed in claim 8, wherein said housing is formed of resin.

11. The scanner as claimed in claim 10, wherein said optical device comprises a plurality of f-θ optical devices each forming a particular optical path.

12. The scanner as claimed in claim 8, wherein said optical device is formed of resin.

13. The scanner as claimed in claim 12, wherein said housing is formed of resin.

14. The scanner as claimed in claim 13, wherein said optical device comprises a plurality of f-θ optical devices each forming a particular optical path.

15. In an image forming apparatus for scanning a photoconductive element with a scanning beam issuing from an optical scanner to thereby form a latent image, developing said latent image to thereby form a corresponding toner image, transferring said toner image to a recording medium, and fixing said toner image on said recording medium, said optical scanner comprises:
   a polygonal mirror for steering the scanning beam incident thereto;
   an optical device located in the vicinity of said polygonal mirror;
   a housing supporting said polygonal mirror and said optical device; and
   a heat radiation guide adjoining said polygonal mirror and formed integrally with or separately from said housing and having a guide surface that is inclined relative to an axis of rotation of said polygonal mirror and intersects a plane virtually formed by the scanning beam.

16. In an image forming apparatus for scanning a photoconductive element with a scanning beam issuing from an optical scanner to thereby form a latent image, developing said latent image to thereby form a corresponding toner image, transferring said toner image to a recording medium, and fixing said toner image on said recording medium, said optical scanner comprises:
   a polygonal mirror for steering the scanning beam incident thereto;
   an optical device located in the vicinity of said polygonal mirror;
   a housing supporting said polygonal mirror and said optical device; and
   a heat radiation guide adjoining said polygonal mirror and formed integrally with or separately from said housing and having a guide surface that is inclined relative to an axis of rotation of said polygonal mirror, said heat radiation guide being located at a position not corresponding to a position of said optical device.

* * * * *